United States Patent
Nilsson et al.

[11] 3,880,151
[45] Apr. 29, 1975

[54] PRESSURE RECEIVER

[75] Inventors: Kenth Ake Sune Nilsson, Akersberga; Erik Olof Roland Larsson, Sollentuna, both of Sweden

[73] Assignee: Siemens-Elema AB, Solna, Sweden

[22] Filed: July 6, 1973

[21] Appl. No.: 376,932

[30] Foreign Application Priority Data
July 12, 1972 Sweden................................ 9166/72

[52] U.S. Cl............. 128/2.05 E; 128/2.05 D; 73/406
[51] Int. Cl................................................. A61b 5/02
[58] Field of Search................. 128/2.05 E, 2.05 D; 73/406, 408, 398 AR; 92/99, 100, 96

[56] References Cited
UNITED STATES PATENTS

| | | | |
|---|---|---|---|
| 69,894 | 10/1867 | Beardslee............................ | 73/406 |
| 2,535,998 | 12/1950 | Bierman............................... | 73/406 |
| 3,499,434 | 3/1970 | Ullrich et al...................... | 128/2.05 D |
| 3,625,199 | 12/1971 | Summers............................. | 128/2.05 D |
| 3,631,850 | 1/1972 | Levasseur.......................... | 128/2.05 E |
| 3,713,341 | 1/1973 | Madsen et al................... | 128/2.05 D |

*Primary Examiner*—Richard A. Gaudet
*Assistant Examiner*—Lee S. Cohen

[57] ABSTRACT

A pressure receiver for measuring intravascular pressure, and preferably pressure of body fluids in which a pressure chamber is formed as a truncated or frusto-conical cone, within which a conical member is positioned so as to extend in an oppositely directed and symmetrical relationship with respect to the truncated cone; the conical member being ended at its smaller end portion by a rounded-off, preferably spherically curved surface, the surface of the conical member being at a radially spaced distance from the smaller base surface of the truncated cone of the chamber, and in which the conical member is positioned so that its rounded-off end surface lies at an axial distance with respect to the larger surface of the truncated cone of the chamber surface; passageways which are interconnected with the pressure chamber extending from the larger base surface of the conical member; and a separating element being positioned on the larger surface of the truncated cone of the chamber intermediate a pressure sensing or feeling portion and the pressure chamber.

8 Claims, 2 Drawing Figures

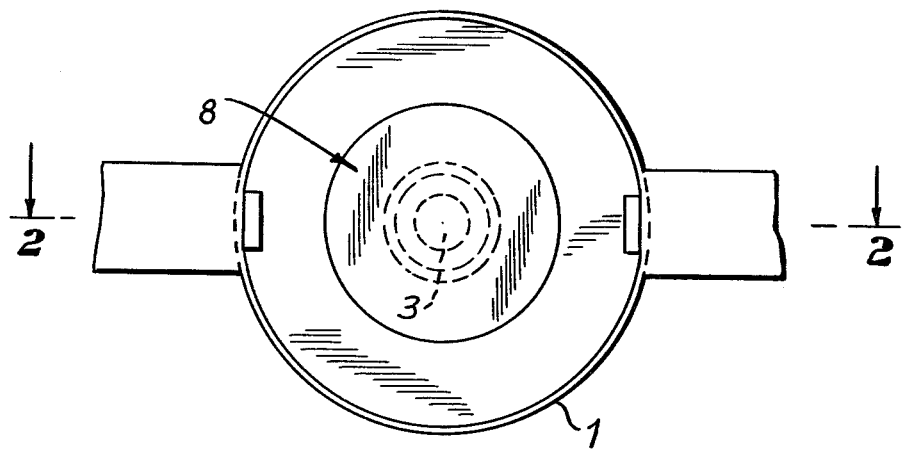
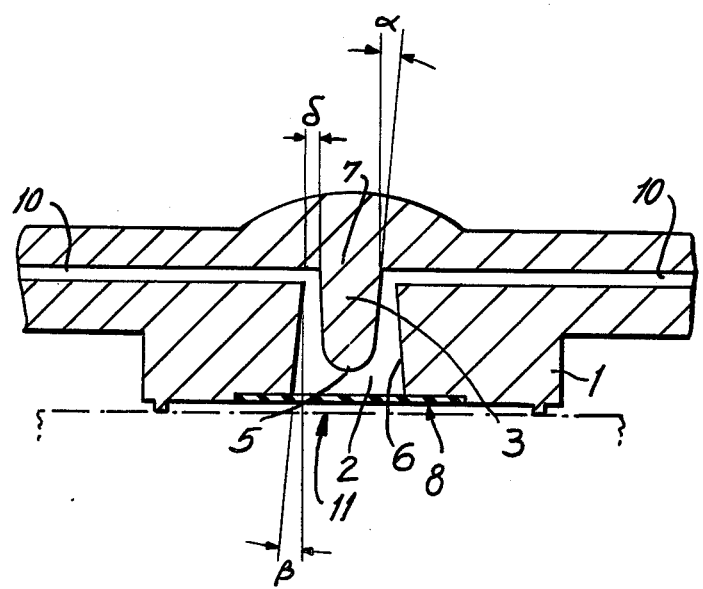

PRESSURE RECEIVER

FIELD OF THE INVENTION

The present invention relates to a pressure receiver for the measurement of intravascular pressure, preferably the pressure of body fluids, and in which the pressure receiver encompasses a pressure chamber and a pressure sensing component.

DISCUSSION OF THE PRIOR ART

Presently known pressure receivers of this type are subject to various drawbacks. Thus, the air-free filling of the pressure receiver with a coupling fluid requires that there either results the assembly or positioning of the receiver in the coupling fluid, or results in that the filling of the receptor is carried out under concurrently effected measures, in which, for example, one such measure may consist of that the receiver must be knocked or rapped in order to remove air bubbles therefrom. The presence of air (bubbles) in the coupling fluid inherently engenders the creation of erroneous measuring values and, in medical applications for the receiver, may lead to endangering of the patient. Furthermore, presently known pressure receivers must, generally, be removed from their holders or mounting supports during their filling and emptying. Moreover, in pressure receivers for the measurement of intravascular pressure, particularly those which are adapted for medical purposes, there is also a requirement to provide for a high degree of safety for the patient from an electrical viewpoint, without the transmission thereof being sensitive to disturbances. In addition to the foregoing, such pressure receivers must be sterilizable in an autoclave.

SUMMARY OF THE INVENTION

Accordingly, it is an object of the present invention to provide a pressure receiver, which afford an increased measuring assurance, which permits the utilization of a simple method for the air-free filling and emptying of the pressure receiver, which is electrically insulated from and safe with respect to a patient without being particularly sensitive to disturbances, and which is adapted to be sterilized in an autoclave.

This object is attained in accordance with the invention, in that the pressure chamber of the pressure receiver is formed as a truncated cone, within which a conical member is positioned so as to extend in an oppositely directed and symmetrical relationship with respect to the truncated cone; the conical member being ended at its smaller end portion by a rounded-off, preferably spherically curved surface, the surface of the conical member being at a radially spaced distance from the smaller base surface of the truncated cone of the chamber, and in which the conical member is positioned so that its rounded-off end surface lies at an axial distance with respect to the larger surface of the truncated cone of the chamber surface; passageways which are interconnected with the pressure chamber extending from the larger base surface of the conical member; and a separating element being positioned on the larger base surface of the truncated cone of the chamber intermediate a pressure sensing or feeling portion and the pressure chamber.

BRIEF DESCRIPTION OF THE DRAWING

Reference may now be had to an exemplary embodiment of a pressure receiver according to the invention, taken in conjunction with the accompanying drawing, in which:

FIG. 1 illustrates, in a bottom plan view, a pressure receiver according to the present invention; and FIG. 2 is a sectional view taken along line 2—2 in FIG. 1.

DETAILED DESCRIPTION

Referring now in particular to the drawing, for purposes of illustration and clarity, the pressure sensing or feeling portion of the pressure receiver is not disclosed in detail.

In the embodiment illustrated in the drawing, a pressure chamber 2 is formed in an essentially cylindrical body 1 of a pressure receiver. The pressure chamber 2 is shaped as a generally concentric frusto-conical recess formed in the body 1. A conical element 3 is located in the pressure chamber, extending at its smaller cone end portion into a rounded-off or spherically curved surface 5. The conical element 3 projects with its smaller portion into the wider portion of the frusto-conical recess. The annular side walls of the recess are designated with reference numeral 6. Passageways 10 each end at the smaller base surface of the frusto-conical recess. A membrane 8 is located at the lower extreme or end surface of the member 1 and bacteriologically and electrically separates the pressure chamber 2 at its larger base surface from the pressure feeling or sensing portion 11, which is not disclosed in further detail. The angles $\alpha$ and $\beta$, which respectively define the incline or shape of the frusto-conical recess, and that of the conical element 3, are in the range of between 2° and 20° and, for example, preferably 5°, while the distance $\delta$ defines the difference between the radii of the small base extension of the frusto-conical recess and the large base extension of the conical member, having values of between 0.5 mm and 2 mm and, for example, preferably 1.2 mm. The passageways 10 serve on the one side, for example, for the attachment of suitable catheters or cannulas which are introduced in the body of a patient, whereby the pressure chamber 2 is filled with body fluid, and on the other side for the connection to an infusion bottle and/or a rinsing arrangement for the receiver. The above-mentioned hydrodynamic configuration of the pressure chambers permits the pressure receiver to be filled simply and air-free with fluid, and to be rinsed out by the actual body fluid, without requiring that the pressure receiver be removed from its container or support.

The air-free filling is facilitated in that the distance $\delta$ has a predetermined size in consideration of the size of the air bubbles which are formed in the pressure chamber. The size of the air bubbles is determined by the materials in the walls of the pressure chamber. The distance $\delta$ between the spherically curved surface and the membrane is pre-selected so that the occurring air bubbles are conveyed into the annular space between both conical walls in the pressure chamber proximate the mouths or inlets of the passageways so as to be, for example, taken along by the rinsing fluid and thereby removed from the pressure chamber. The presently smaller sized air bubbles, which are eventually compressed in the pressure chamber, cannot adhere to the walls of the pressure chamber but are removed through the annular space from the pressure chamber. The rinsing out of the chamber is facilitated in that the conical member 3 generates a turbulence in the inflowing rinsing fluid. Due to this turbulence thicker or more viscous fluids such as, for example, blood, may be removed from the walls of the chamber and the remaining portion of the pressure chamber.

The employment of the membrane 8 provides for that the fluid portion of the pressure formers 2, 10, which are, for example, in contact with a patient, are electrically insulated from the pressure feeling or sensing electrical component, which inherently indicates that, with reference to a patient, the pressure receiver is electrically safe. The utilization of a detachable membrane 8 also facilitates that the fluid-containing portion may be sterilized in an autoclave.

While there has been shown what is considered to be the preferred embodiment of the invention, it will be obvious that modifications may be made which come within the scope of the disclosure of the specification.

What is claimed is:

1. Pressure receiver for the measurement of intravascular pressure and the pressure of body fluids or the like; said pressure receiver comprising, a pressure chamber, and pressure sensing means communicating with said pressure chamber, said pressure chamber including a frusto-conical recess portion, a conical member symmetrically projecting into said frusto-conical recess having a slope opposite to that of the frusto-conical recess, said conical member having the sloped conical surface thereof extending into a substantially spherically curved end surface at its smaller conical end portion, the annular surface of the conical member being at a radially spaced distance from the smaller annular apex surface of the frusto-conical recess and the spherically curved surface of said conical member being an axially spaced distance from the larger annular base surface of said frusto-conical recess, passageways communicating with said pressure chamber proximate the larger annular base surface of said conical member at the smaller annular base surface of said frusto-conical recess, and substantially planar separating means being provided at the larger base surface of said frusto-conical recess intermediate said pressure sensing means and said pressure chamber, said passageways extending in parallel with said substantially planar separating means.

2. Pressure receiver as claimed in claim 1, said separating means comprising a flexible membrane, said membrane being adapted to bacteriologically and in an electrically insulative manner separate said pressure sensing means and said pressure chamber.

3. Pressure receiver as claimed in claim 1, wherein the generatrix of the conical surface of said frusto-conical recess subtends an angle in the range of approximately 2° and 20° with the axis of symmetry said recess.

4. Pressure receiver as claimed in claim 3, said angle being 5° with respect to the axis of symmetry.

5. Pressure receiver as claimed in claim 1, wherein the generatrix of the conical surface of said conical member subtends an angle in the range of approximately 2° to 20° with the symmetrical axis of said frusto-conical recess.

6. Pressure receiver as claimed in claim 5, said angle being 5° with respect to the axis of symmetry.

7. Pressure receiver as claimed in claim 1, said conical member being at a radial spacing relative to the smaller annular apex surface of said frusto-conical recess of between 0.5 mm and 2 mm.

8. Pressure receiver as claimed in claim 7, said radial spacing being 1.2 mm.

* * * * *